(12) United States Patent
Porter et al.

(10) Patent No.: US 11,376,926 B2
(45) Date of Patent: Jul. 5, 2022

(54) FINGER TAB INTERFACE FOR VEHICLE PRESSURE RELIEF VALVE INCORPORATED INTO A VENTILATION MODULE FOR PROVIDING SLOW CLOSING/OPENING OF VALVE UNDER LOW PRESSURES RESULTING FROM A DOOR SLAM EVENT

(71) Applicant: U.S. Farathane Corporation, Auburn Hills, MI (US)

(72) Inventors: Steve Porter, Auburn Hills, MI (US); John Klinkman, Auburn Hills, MI (US)

(73) Assignee: U.S. Farathane Corporation, Auburn Hills, MI (US)

( * ) Notice: Subject to any disclaimer, the term of this patent is extended or adjusted under 35 U.S.C. 154(b) by 321 days.

(21) Appl. No.: 16/528,882

(22) Filed: Aug. 1, 2019

(65) Prior Publication Data
US 2020/0062084 A1 Feb. 27, 2020

Related U.S. Application Data

(60) Provisional application No. 62/723,232, filed on Aug. 27, 2018.

(51) Int. Cl.
*B60H 1/34* (2006.01)
*B60H 1/00* (2006.01)

(52) U.S. Cl.
CPC ....... *B60H 1/3421* (2013.01); *B60H 1/00857* (2013.01); *B60H 2001/3478* (2013.01)

(58) Field of Classification Search
CPC combination set(s) only.
See application file for complete search history.

(56) References Cited

U.S. PATENT DOCUMENTS

| 5,419,739 | A | 5/1995 | Lewis |
| 5,904,618 | A | 5/1999 | Lewis |
| 6,085,781 | A | 7/2000 | Boutry |
| 6,866,576 | B2 | 3/2005 | Quinn et al. |
| 7,077,742 | B2 | 7/2006 | Stevenson et al. |
| 9,566,845 | B2 | 2/2017 | Rizzo et al. |
| 2005/0199845 | A1* | 9/2005 | Jones .............. F16K 15/033 251/129.06 |
| 2008/0305732 | A1 | 12/2008 | Dippel et al. |
| 2009/0280736 | A1 | 11/2009 | Schneider |

(Continued)

*Primary Examiner* — Avinash A Savani
*Assistant Examiner* — Dana K Tighe
(74) *Attorney, Agent, or Firm* — Dinsmore & Shohl LLP (57) ABSTRACT

A ventilation module for a vehicle having a housing including a flap hingedly secured along an inner edge to the housing to extend across its open interior. The flap includes side edges and an interconnecting outer edge which contact, in a closed flap condition, support locations configured along the housing to define its open interior. One or more fingers extend from at least one of the side and outer edges of the flap so that the fingers abut standoff locations of the housing located in proximity to the support locations. Upon a sufficient positive air pressure condition created within the passenger compartment which overcomes a holding force exerted by the fingers against said stand-offs, the flap is allowed to open in a controlled fashion to vent to the exterior the excess air pressure, until reclosing upon achieving an air equilibrium condition.

10 Claims, 9 Drawing Sheets

(56) References Cited

U.S. PATENT DOCUMENTS

2010/0243083 A1   9/2010   Shereyk et al.
2012/0003907 A1*  1/2012   Carlson .................. B60H 1/248
                                                  454/70
2015/0015873 A1   1/2015   Baba et al.

* cited by examiner

FINGER TAB INTERFACE FOR VEHICLE PRESSURE RELIEF VALVE INCORPORATED INTO A VENTILATION MODULE FOR PROVIDING SLOW CLOSING/OPENING OF VALVE UNDER LOW PRESSURES RESULTING FROM A DOOR SLAM EVENT

CROSS REFERENCE TO RELATED APPLICATIONS

The present application claims the priority of U.S. Ser. No. 62/723,232 filed Aug. 27, 2018.

FIELD OF THE INVENTION

The present invention teaches a pressure relieve valve (PRV) design integrated into a ventilation tray assembly incorporated into a vehicle. The PRV design incorporates any number of configurations depicting projecting dampening fingers associated with any non-hingedly connected edges of the flap, this including any of side and/or forward extending edges relative a pivotally secured flap edge to the comparatively more rigid PRV tray. The fingers interact with stand-offs incorporated into the tray and, in an abutting and sealed position, provide for a measure of delay in the displacement of the flap in subsequent response to instantaneous forces. This results in slower opening/closing motion of the flap in response to such as an instantaneous pressure event, and which can result from such as a door slam condition in which an interior pressure of the passenger compartment momentarily exceeds that of the ambient exterior.

As further disclosed, the variants of the finger projections disclosed are abutted to the standoffs when the flap(s) are in the closed position and with enough resistance to maintain the flaps closed until a certain amount of pressure is reached, at which point the fingers are forced in a hinged over-center condition relative to recessed bend axis configured between a base of the fingers and the associated flap edge, causing the flap to subsequently separate from the stand-offs to allow the flap to open. Reducing the number of times the flaps contact the housing during the door slam condition (such creating undesirable oscillating pressure within the vehicle) results in quieter flap operation.

BACKGROUND OF THE INVENTION

The prior art is documented with examples of vehicle supported ventilation tray housings, such as utilized with a pressure relieve valve or flap. Such ventilation assemblies are integrated into a vehicle for providing unidirectional air flow out of the passenger compartment, such as in response to such as excess air pressure within the compartment, and in order to provide for the comfort of the vehicle occupants.

Reference is made to one example of a pressure relief assembly depicted in US 2010/0243083 to Shereyk, which teaches a combination membrane flap and stabilizing member for limiting opening motion of the flap to the outer edges in response to a determined pressure. The assembly includes a main housing having an air passage chamber and a flopper positioned on or within the air passage chamber. The flapper includes a membrane flap and a stabilizing member extending toward a center of the membrane flap. The stabilizing member prevents the center of the flap from opening, but allows outer free edges of the membrane flap to open when air flow at a particular pressure is exerted into the membrane flap from an opening direction.

Other examples from the prior art include the flap type pressure relief valve of Lewis, U.S. Pat. No. 5,419,739, which includes a frame having an opening therethrough controlled by a valve flap in the form of a flexible sheet of material mounted to the frame along a first side of the opening to overlie the opening. The flexible sheet is joined to the frame by a connection comprising slots through the frame adapted to receive and retain tabs on the valve flap that extend through the apertures. The tabs are formed of resilient and compressible elastomeric material and have enlarged first and second retaining ribs extending closely adjacent the respective slot on both side faces of the frame with a necked connecting portion disposed between the first and second ribs. The connecting portion of each tab is seated within the respective aperture and is under compression and completely fills the aperture and compressively engages the frame. The retaining ribs hold the valve flap in its assembled location.

Schwartzkpof et al., US 2015/0165873, teaches a return air blocking device for ventilation of the interior of a motor vehicle, with a frame or housing with at least one sealing surface and with at least one flexible valve flap mounted on the frame or the housing, which in an idle position abuts on the sealing surface and prevents a flow of air through the return air blocking device, and which, when a sufficient pressure occurs, assumes an opening position lifted from the sealing surface in which it allows a flow of air through the return air blocking device, wherein the at least one valve flap comprises at least one slit on its end mounted on the frame or housing, wherein the frame or the housing comprises at least one holding projection which engages in the at least one slit.

Schneider, US 2009/0280736, teaches a back-air blocking device to ventilate a motor vehicle's inside space, and including a frame or housing made of a first plastic, along with a valve flap made of a flexible material which is connected in one zone to the frame and in other zones resting against a sealing surface of the frame when the flap is in its rest position. The flap further detaches off of the sealing surface when subjected to a pressure differential.

SUMMARY OF THE INVENTION

The present invention discloses a pressure relieve valve (PRV) design integrated into a ventilation tray assembly incorporated into a vehicle. The ventilation module includes a housing defining an open interior and is adapted to secure to a location of the vehicle in order to communicate an exterior with a passenger compartment interior.

A flap, such as constructed of a suitable flexible rubberized material, is hingedly secured along an inner edge to the housing and so that the flap extends across the housing open interior. The flap, such as provided in a rectangular configuration, further includes side edges and an interconnecting outer edge which contact, in a closed flap condition relative to the rigid PRV housing, support locations configured along the housing in proximity to the open interior.

At least one finger extends from at least one of the side and/or outer edges of the flap and, in a flap sealed condition, abut standoff locations of the housing located in proximity to the support locations to seal the flap against the housing, thereby preventing the admittance or backflow of dirty air from the exterior into the interior compartment. The flaps further open in a second direction in response to a positive air pressure condition created within the passenger compartment, such as which can result from a door slam event, and which overcomes a holding/abutting force exerted by the fingers against the stand-offs to unseat the fingers and to pivot the flap to an open flap condition in order to vent to the exterior the excess air pressure until reclosing upon achieving an air equilibrium condition.

As previously described, the PRV design incorporates any number of dampening fingers associated with an edge of each soft flap opposite its pivotal mounting to the more rigid PRV tray, such interacting with stand-offs incorporated into the tray in order to provide for slower opening/closing motion in response to an instantaneous pressure event resulting from such as the door slam condition. The fingers are bent in a manner such that they exhibit a degree of flex or bend in contact with the tray standoffs, with enough resistance to maintain the flaps closed until a certain amount of pressure is reached, at which point the fingers are forced over-center over a hinged relationship established between the base connection of each finger and the associated edge of the flap to allow the flap to open. Reducing the number of times the flaps contact the housing during the door slam condition (such creating oscillating pressure within the vehicle) provides for quieter flap operation.

Additional variants can further envision the contact fingers being reconfigured to extend in an opposite lateral fashion from a front edge configured tab associated with the flexible flap. Without limitation, the fingers can also be reconfigured so that they are positioned in opposite lateral fashion relative to forward most proximate locations of the flap side edges.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With reference to the present illustrations, the present invention discloses a pressure relieve valve (PRV) design integrated into a ventilation tray assembly incorporated into a vehicle. As previously described, the PRV design incorporates any number of dampening fingers associated with an edge of each soft flap opposite its pivotal mounting to the more rigid PRV tray, such interacting with stand-offs incorporated into the tray in order to provide for slower opening/closing motion in response to an instantaneous pressure event resulting from such as a door slam condition.

As further described, the fingers are bent and engaged to the standoffs when the flap(s) are in the closed position, with enough resistance to maintain the flaps closed until a certain amount of pressure is reached, at which point the fingers are forced over-center to allow the flap to open. Reducing the number of times the flaps contact the housing during the door slam condition (such creating oscillating pressure within the vehicle) provides for quieter flap operation.

Figure 1:
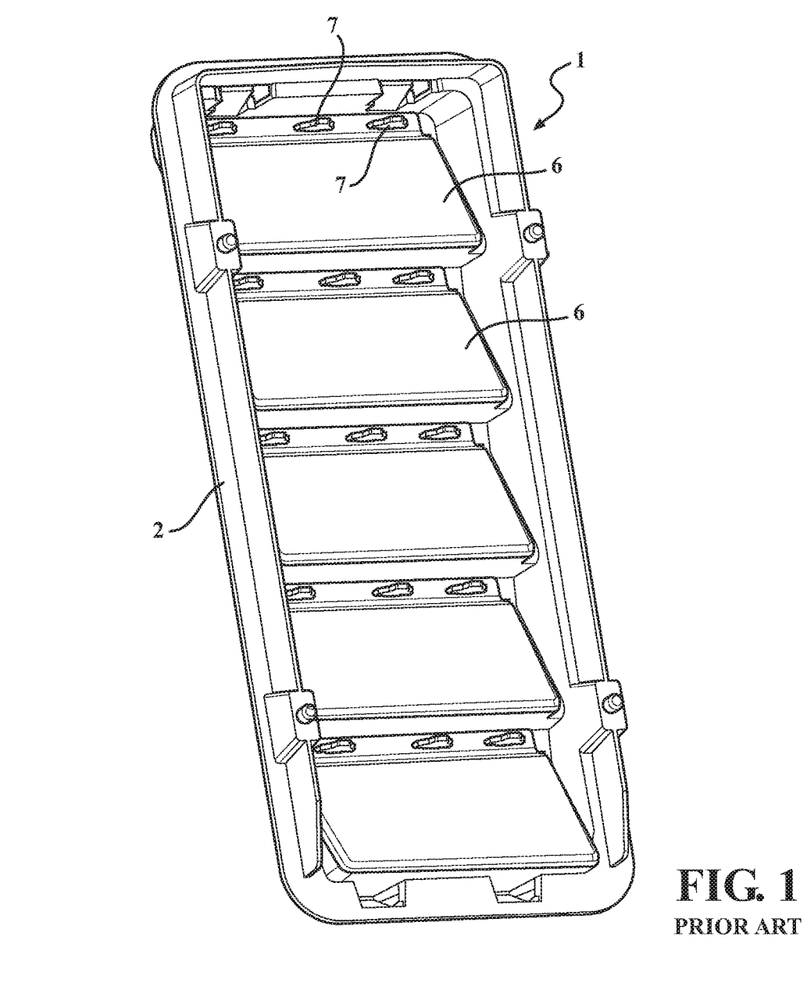
FIG. 1 is a perspective view of a pressure relief valve (PRV) assembly according to the Prior Art and including a rigid housing with a soft attachable flap.
Figure 1A:
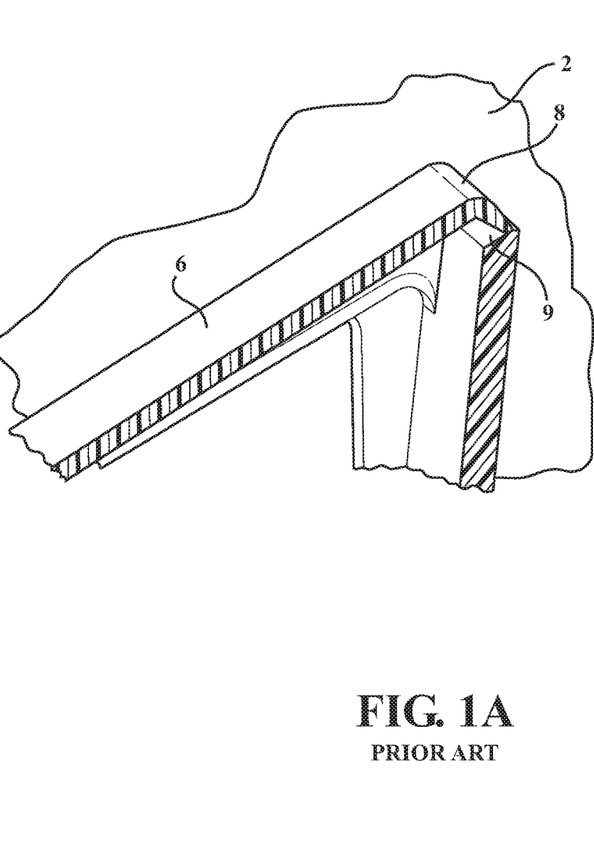
FIG. 1A is an illustration of the PRV assembly of FIG. 1 and showing a configured free end of the flap in a closed position relative to a window defining support shoulder of the rigid housing.
Figure 1B:
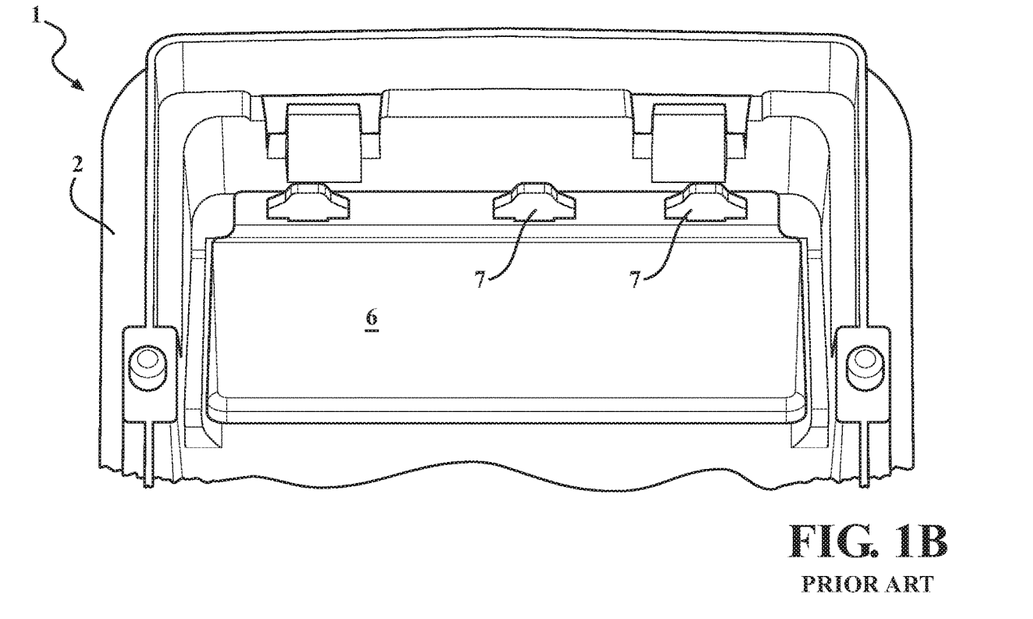
FIGS. 1B and 1C illustrate front perspectives of the PRV assembly of FIG. 1 in closed and opened positions.
Figure 1C:
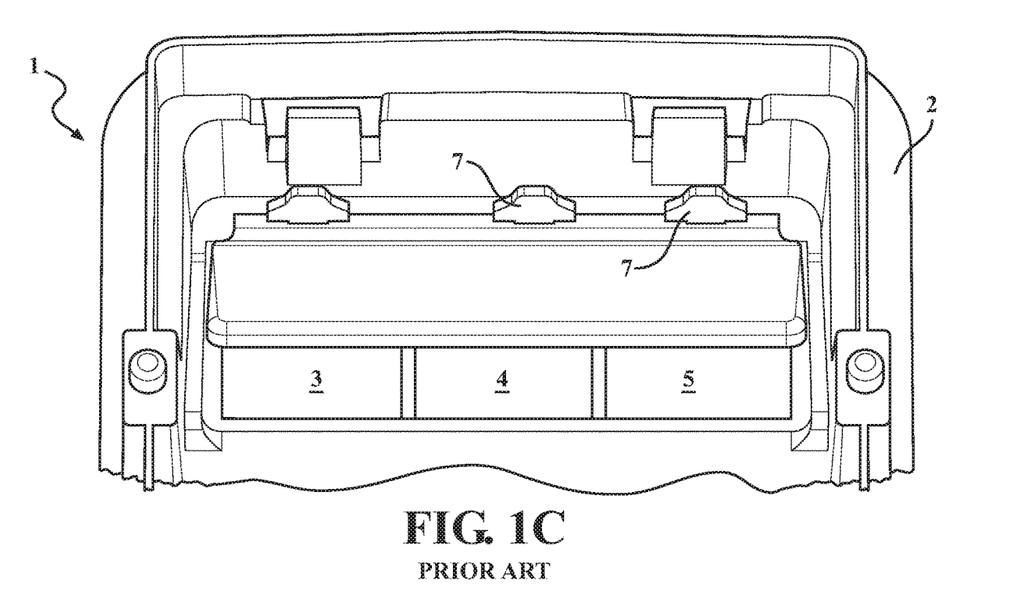

As is also known in the Prior Art, the ventilation module, such as shown at 1 in each of FIGS. 1, 1B and 1C, is integrated into a vehicle (not shown). A housing 2 (such as constructed of any rigid plastic material) has a generally tray shape with one or more windowed interior openings (see at 3, 4 and 5 in FIG. 1C) which is adapted to secure to a location of the vehicle in order to communicate an exterior with a passenger compartment interior. A flap 6 (such as constructed of a softer and flexible plastic) is hingedly secured along a selected edge of the rigid tray or housing 2 (see mounting posts 7 with ledge defined undersides for seating edge proximate configured slots in the flexible flap at a base edge housing tray mounting location) and so that the flap (or multiple flaps secured to the housing tray) extends across the open defined interior of the housing. The flaps 6 each further includes first and second side edges and an interconnecting top extending edge 8 (see FIG. 1A) which can include an angled tip configured to abut a support location 9 configured along the rigid housing tray in proximity to the defined open interior in a closed flap configuration.

In this fashion, the flaps are configured to seal against the housing in a first direction to prevent the admittance or backflow of dirty air from the exterior into the interior compartment. The flaps open in a second direction in response to a positive air pressure condition created within the passenger compartment and in order to vent to the exterior the excess air pressure until reclosing upon achieving an air equilibrium condition.

Additional features include the housing 2 having a generally rectangular outer profile or shape with an outer perimeter gasket which is secured to an outer perimeter projecting ledge and which defines a sealing surface for securing the housing to the vehicle. The housing further typically includes a rigid first shot injection molded thermoplastic, with the flaps further including a second shot softer injection molded plastic. The illustrated embodiments depicts a single flap 6 secured over the collective interior of the housing tray (windows 3, 4 and 5 shown depicted in FIG. 1C and separated by internal spaced reinforcements). It is understood that the present invention also contemplates the provision of a single flap which can be reconfigured as a plurality (such as three) of flaps resistively engaged to the housing along bottom edges thereof and in order to seal the first, second and third subset open interiors.

Figures 2, 3:
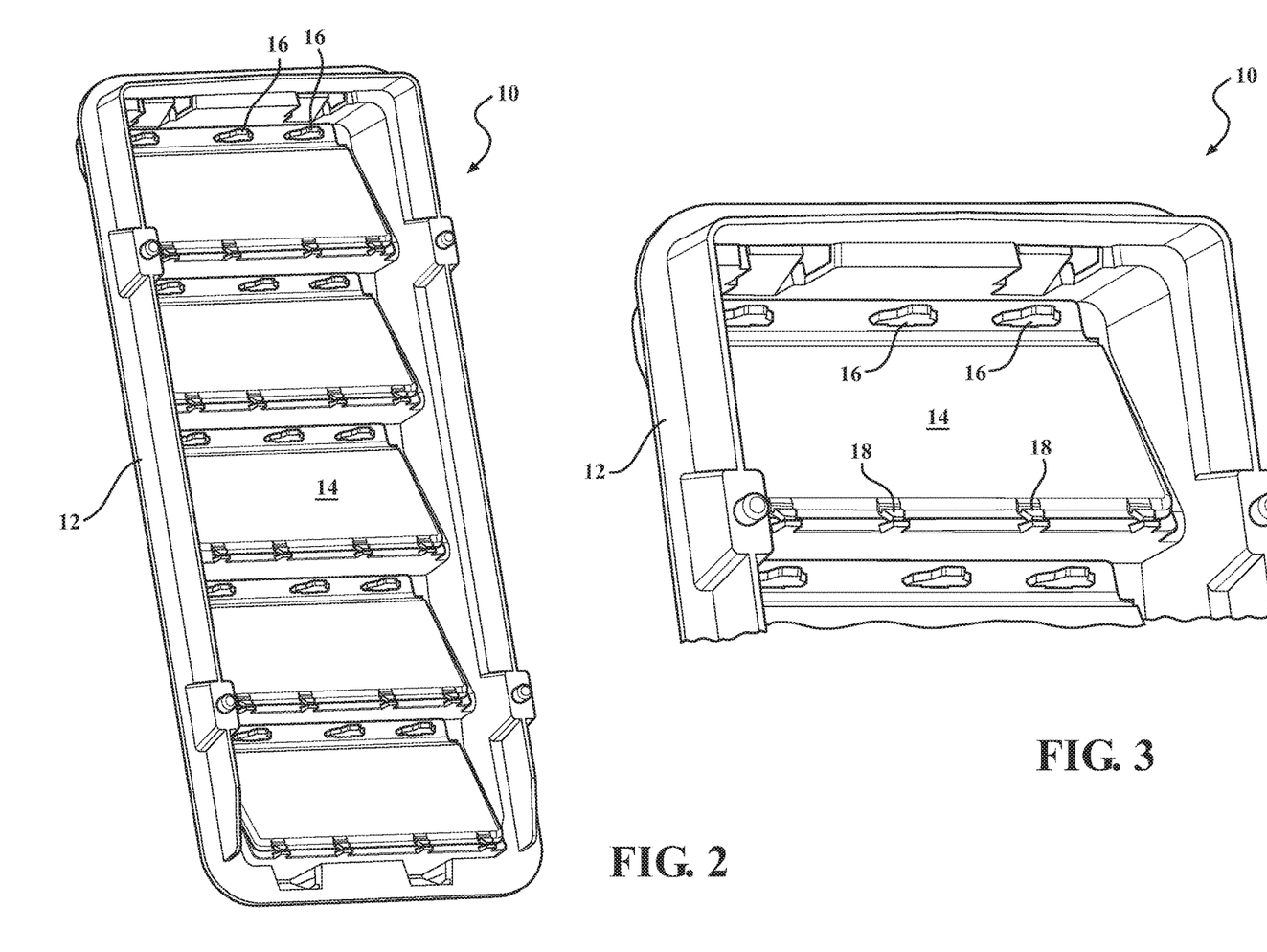
FIG. 2 is a perspective view of a PRV assembly according to one embodiment of the present invention comparable to that shown in the prior art illustration of FIG. 1.
FIG. 3 is an enlarged partial perspective of FIG. 2 and better illustrating the feature of the extending finger tabs associated with the free end of the flap which provides for slow closing and resistance to opening under lower pressures.

Referring now to FIG. 2, a perspective view is depicted generally at 10 of a PRV assembly and ventilation module according to one embodiment of the present invention comparable to that shown at 1 in the prior art illustration of FIG. 1. As additionally depicted in enlarged partial perspective of FIG. 3, the a rigid tray housing 12 is provided similar to that depicted at 2 in FIG. 1 and to which a plurality of individual flaps 14 are secured in a similar fashion as previously described. Without limitation, this can include a similar arrangement of mounting posts 16 (comparable to those depicted at 7 in FIG. 1) which extend from locations of the housing and which include underside ledges to which are resistively secured the mounting edge of each flap via a slot of the flap which is stretched over the angled upper edges of each post and seat about a narrowed neck of each post and against an underside defined surface.

As further best shown in the enlarged view of FIG. 3, a plurality of fingers 18 extend from outer edge proximate locations of the flap 14. As shown, this includes an arrangement of fingers 18 extending along the outer flap edge (opposite the inner tray mounting edge), however the present invention also envisions the any combination of fingers provided along any of the side and/or outer edges (with specific reference subsequently to the alternate variants of FIGS. 6A-6B and 7A-7B.

Figures 4A, 4B, 4C:
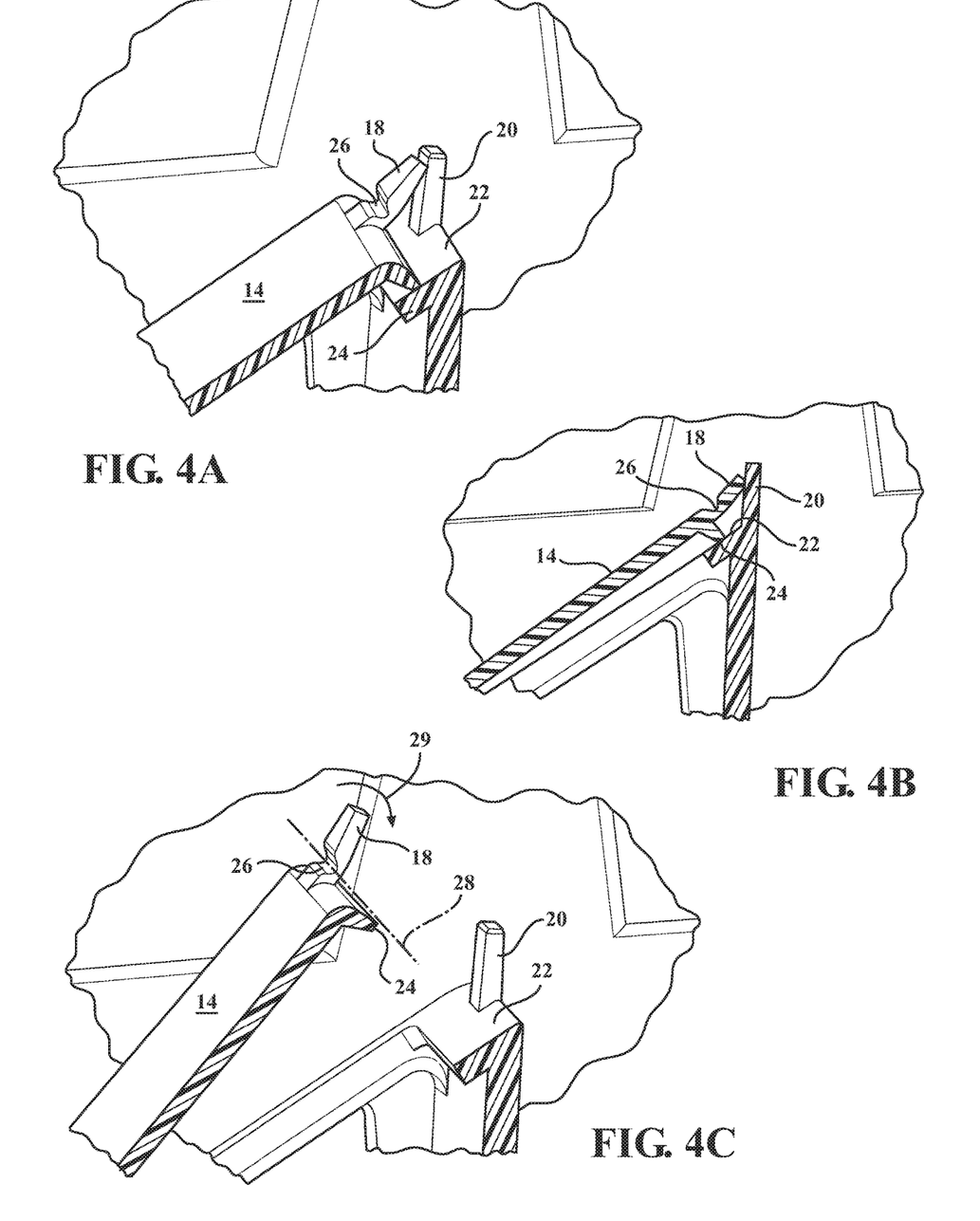
FIG. 4A is a partial perspective of the angled or bent interface of the finger in contact with the rigid standoff of the PRV housing in a closed position.
FIG. 4B is a side plan illustration of FIG. 4A and illustrating from another angle the interference relationship between the soft tab/finger of the flap and the rigid standoff/tab of the PRV housing.
FIG. 4C is a succeeding partial perspective to FIG. 4A and illustrating the flap pivoted to an open position in response to a sufficient pressure differential for forcing open the flap.

FIG. 4A (compare to prior art view of FIG. 1A) is a partial perspective of the angled or bent interface of a selected finger 18 in contact with a rigid standoff 20 of the PRV housing tray 12 in a closed position. The standoff 20 is typically injection molded or otherwise integrally formed with the tray 12 such that the standoff 20 is located proximate a support location 22 (compare to at 9 in FIG. 1A) associated with tray 12 and which in turn supports a configured edge 24 of the flap 14 (this edge 24 comparing to that shown at 9 in the prior art flap 6 of FIG. 1A). Without limitation, the standoffs can be configured with any shape or profile sufficient to provide an abutting surface to the opposing contacting edge of the finger in the flap sealed condition of FIG. 4A.

As further shown in the side plan illustration of FIG. 4B, which depicts FIG. 4A from another angle, the interference relationship is depicted between the soft plastic tab/finger 18 of the flap 14 and the rigid standoff/tab 20 of the PRV housing 12. A hinged connection between the finger 18 and the flap 14 includes a notched base 26 which allows the finger to bend at relative to an angle in relation to the flap, such as depicted in the closed position (FIGS. 4A and 4B).

Upon experiencing a sufficient pressure existing within the inside of the ventilation module (such as associated with a car door slam event), the finger 18 is further caused by the instantaneous interior pressure event to pivot (FIG. 4C) in an over center fashion (about the notched base connecting portion 26 which defines a hinge as depicted by axis 28 extending in a crosswise direction between the finger and flap), this concurrent with the flap 14 flexing in partially rotating fashion about a general clockwise rotational axis 29 (see FIG. 4C) along the surfaces of the associated standoff 22 and prior to unseating from the standoffs, at which point the flap(s) is/are caused to pivot to the open position.

In this fashion, the configuration of the over center pivoting fingers and standoffs cooperate with the normal edge seating action of the flaps and support locations of the tray in order to cause slightly delayed and more deliberate opening and closing (dampening motion) of the flaps, such reducing instances of oscillating pressure occurring within the passenger compartment in response to internal pressure conditions, i.e. resulting from a door slam event and in which the flaps would otherwise be influenced to rapidly oscillate open and closed thereby providing undesirable acoustical and pressure variations within the vehicle passenger compartment.

Figure 5A:
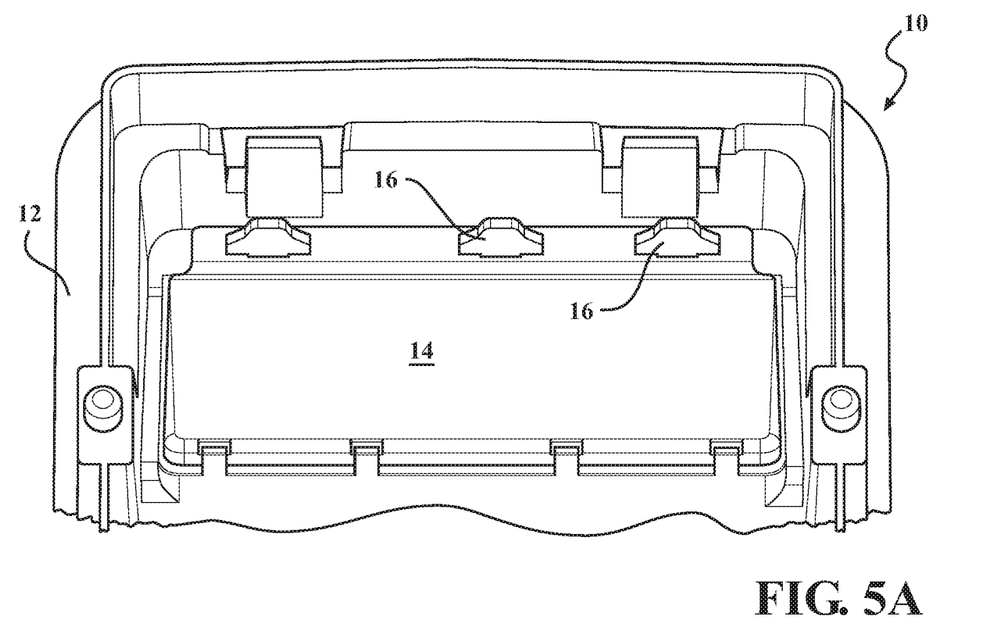
FIGS. 5A and 5B correspond to FIGS. 1B and 1C of the prior art and respectively illustrate front perspectives of the PRV assembly of FIG. 2 in closed and opened positions.
Figure 5B:
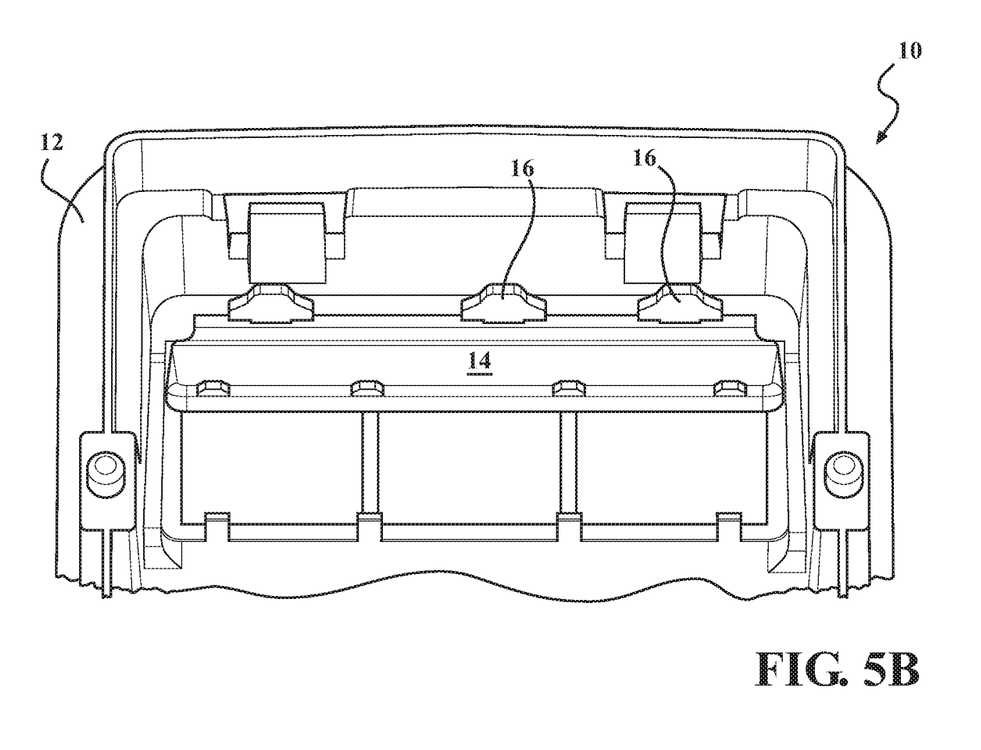

Proceeding to FIGS. 5A and 5B, these further correspond to FIGS. 1B and 1C of the Prior Art and respectively illustrate front perspectives of the PRV assembly of FIG. 2 in closed and opened positions, the opening/closing actuation being again slowed relative to that depicted in the prior art design of FIGS. 1B-1C. The net result of the dampening finger configuration of the present invention is that its contact profile with the housing standoffs, as well as the slight pivotal motion which is required to unseat from the standoff surface in response to an opening direction pressure exerted upon the flap, results in slower opening/closing with attendant reduction in noise (i.e. flap operation is made quieter), and which is again facilitated by the hinged action of the fingers both delaying unseating from the tray standoffs in the opening direction (and until a sufficient internal pressure is reached), as well during the return contacting motion of the fingers with the standoffs (as the flap is reseated upon the perimeter defining housing surface), and thereby in turn controlling the speed of reestablished contacted of the flap edge with the tray support locations during reclosing.

Figure 6A:
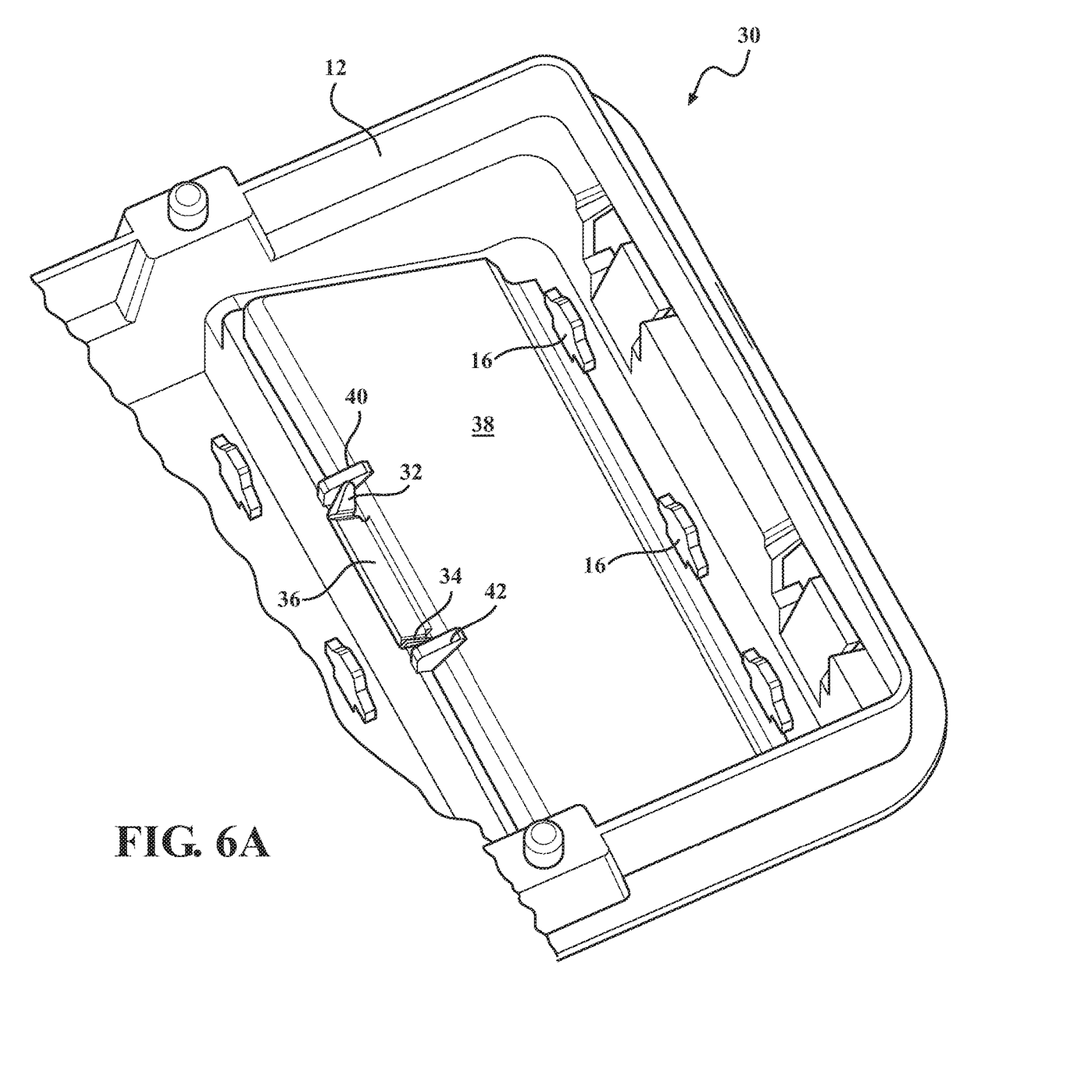
FIG. 6A is a perspective illustration of a further variant of the present invention in which the fingers are reconfigured to extend in an opposite lateral fashion from a front edge configured tab associated with the flexible flap.

Proceeding now FIG. 6A, a perspective illustration is shown at 30 of a further variant of the present invention in which a pair of flexible fingers, these depicted at 32 and 34 and which are reconfigured to extend in an opposite lateral fashion from a front edge configured tab 36, this in turn forming a portion of a flexible flap (further depicted at 38). The tray housing 12 and its flap securing mounting posts 16 are repeated from the prior embodiment shown in FIG. 2.

Figure 6B:
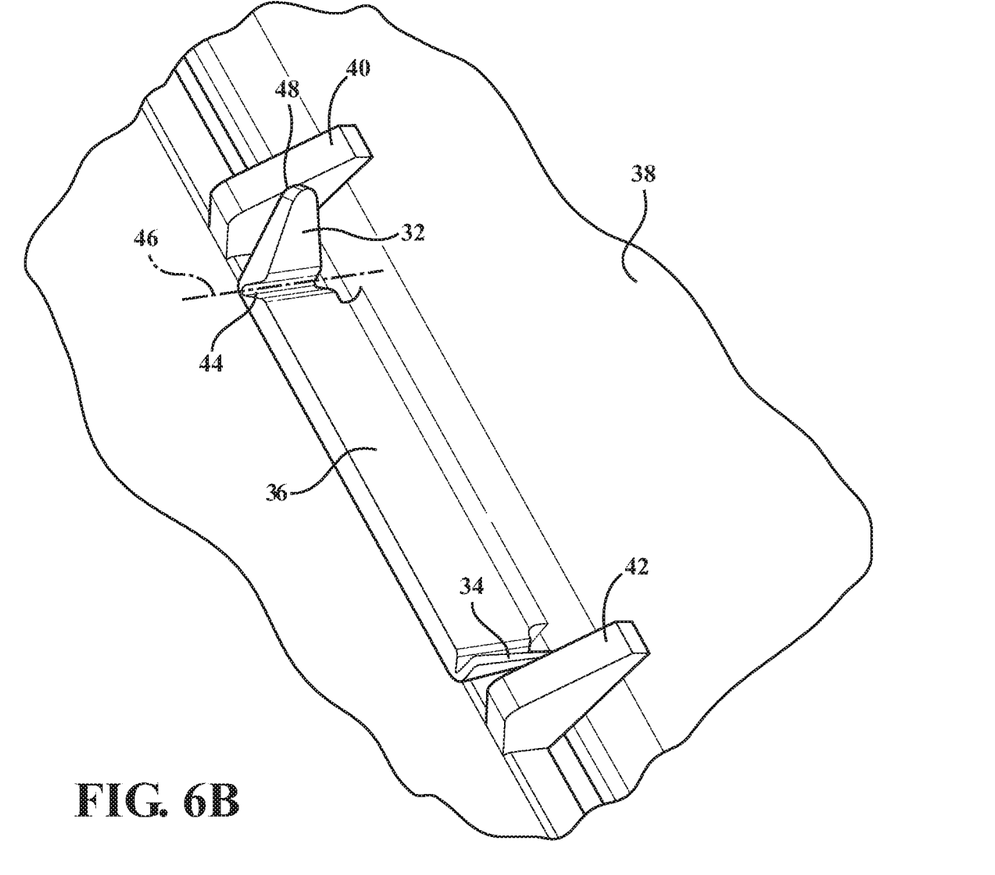
FIG. 6B is an enlarged sectional perspective of the finger and tab configuration shown in FIG. 6A.

As further depicted in the enlarged sectional perspective of the finger and tab configuration of FIG. 6B, a pair of standoffs are shown at 40 and 42 which are integrated into the housing (such as molded or stamped) approximate the forward contacting free edge of the flap 38. As further shown in FIG. 6B, the fingers 32 and 34 can each include a recessed or narrowed dimensioned base (see at 44), along which extends a pivot hinge axis 46 similar to that previously described at 28 in FIG. 4C).

The standoffs 40/42 are configured so that they respectively contact the outer corner edges of each contact finger (see as depicted at 48 for selected finger 32). In this fashion, and upon a sufficient sustained (defined as more than instantaneous) pressure being exerted from an underside of the housing 12, the fingers 32/34 partially displace and separate from the standoffs 40/42 to in turn successively unseat the flap 38 from the perimeter defining rim of the housing in a controlled and non-oscillating fashion.

Figure 7A:
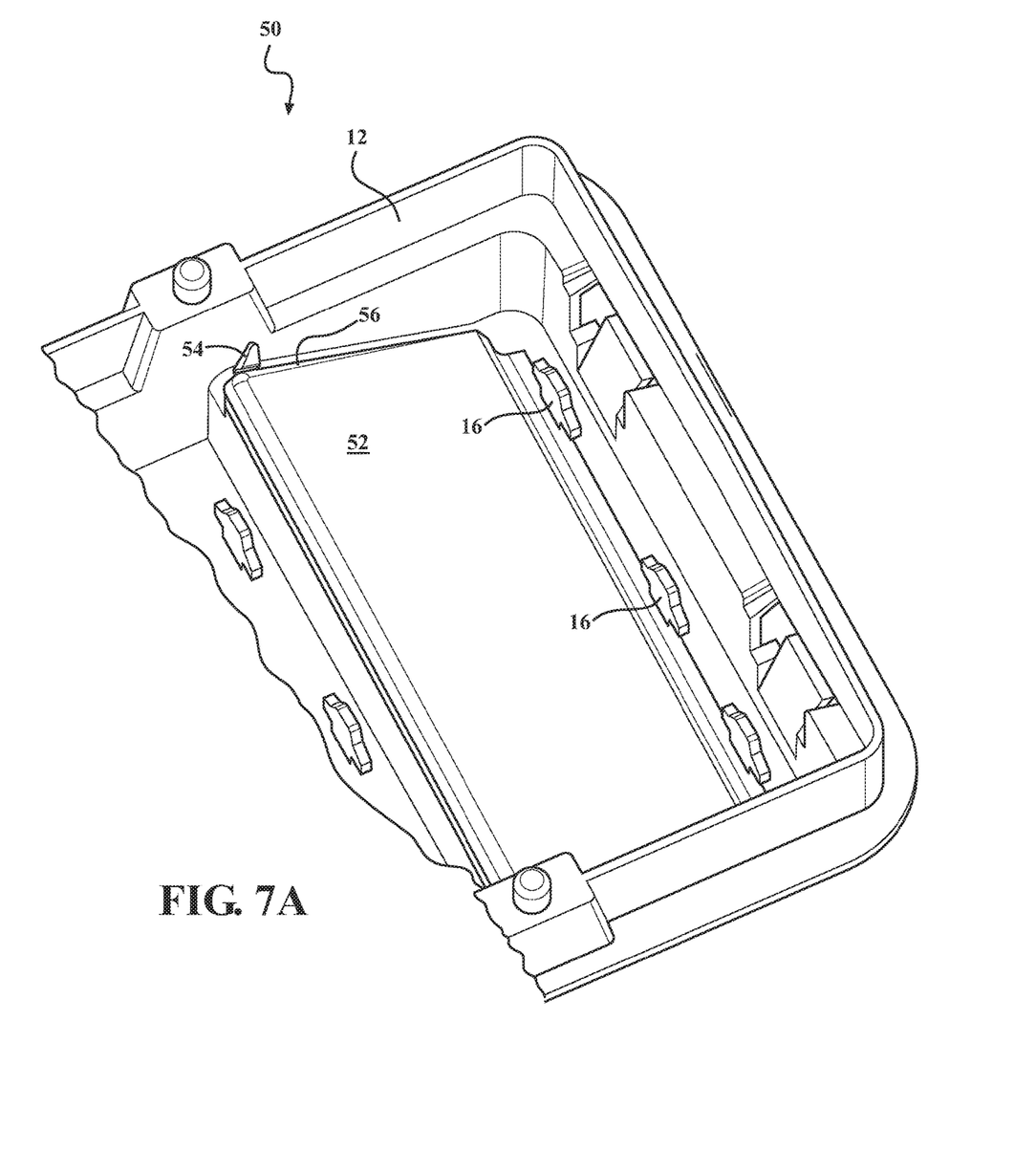
FIG. 7A is a perspective illustration of a yet further variant of the present invention depicting the fingers repositioned in opposite lateral fashion relative to forward most proximate locations of the flap side edges.
Figure 7B:
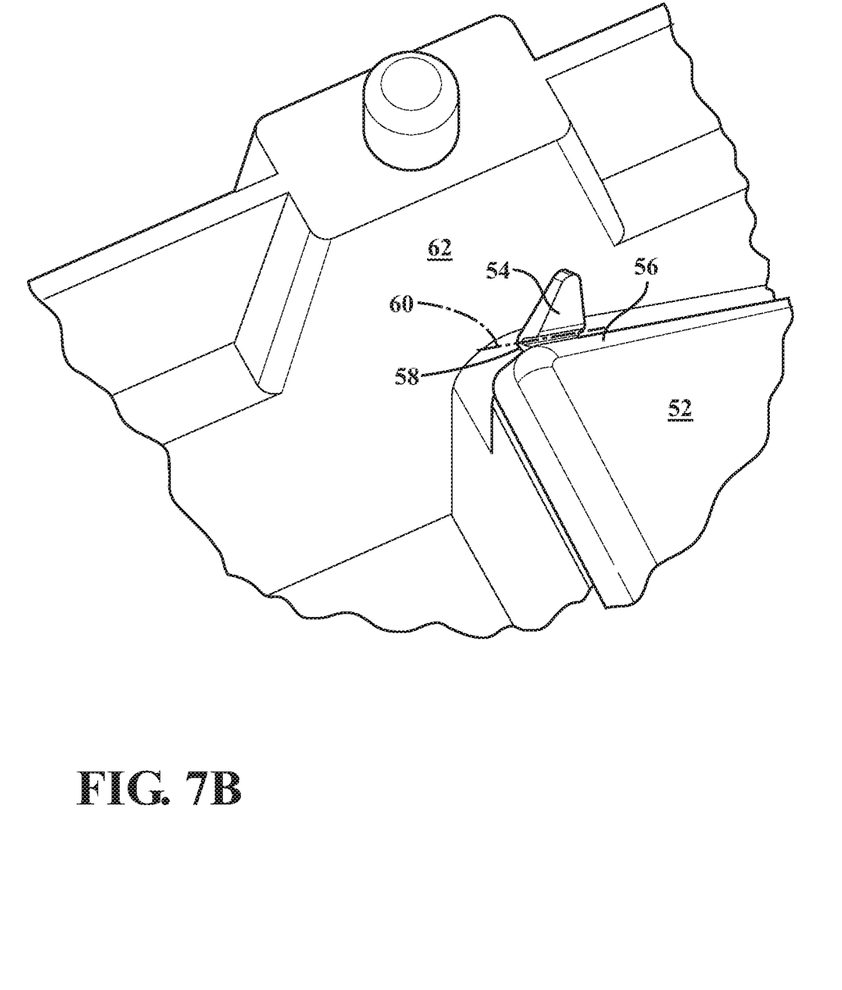
FIG. 7B is an enlarged sectional perspective of the finger configuration shown in FIG. 7A.

Finally, and with reference to FIGS. 7A-7B, a perspective illustration is shown at 50 of a yet further variant of the present invention of a further reconfigured flap 52 depicting fingers (one of which is shown at 54) repositioned in opposite lateral fashion to forward most proximate locations of the flap side edge, see further at 56. FIG. 7B is an enlarged sectional perspective of the finger configuration shown in FIG. 7A and, similar to previous embodiments, depicts a narrowed dimension base 58, further along which is defined a hinge axis 60 for permitting partial pivoting or hinged displacement of the fingers 54 during unseating from an associated standoff surface, in this instance further provided by a vertically extending side wall 62 of the housing which is in close or approximate contact with the side extending fingers 54 of the flap 52.

Having described our invention, other and additional preferred embodiments will become apparent to those skilled in the art to which it pertains without deviating from the scope of the appended claims. This can include the flap construction being reconfigured from the generally rectangular shape to any of a circular, elliptical or other shape consistent with the open perimeter interior outline of the supporting housing.

The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

We claim:

1. A ventilation module for a vehicle, comprising:
    a housing having an inner perimeter defining an open interior and adapted to secure to a location of the vehicle to communicate an exterior with a passenger compartment interior;
    a flap hingedly secured along an inner edge to said housing and extending across said open interior, said flap further including side edges and an interconnecting outer edge spaced apart from said inner edge and sealing said open interior to prevent backflow of air from the exterior into the passenger compartment interior;
    a plurality of fingers projecting at spaced locations along at least said outer edge of said flap, said fingers each further including a notched recess defining a bend axis for bending said fingers in an over center fashion relative to the bend axis during opening of said flap, said fingers aligning with and abutting a plurality of post shaped standoffs projecting from said housing to establish a holding force; and
    said flap opening in response to a positive air pressure condition created within the passenger compartment interior which overcomes the holding force exerted by said fingers against said standoffs and in order to vent to the exterior the positive air pressure until redo sing upon the interior compartment achieving an air equilibrium condition with the exterior.

2. The ventilation module as described in claim 1, said housing having a generally rectangular shape with an outer perimeter adapting to securing said housing to the vehicle.

3. The ventilation module as described in claim 1, said housing and said post shaped standoffs further comprising a rigid first shot injection molded thermoplastic.

4. The ventilation module as described in claim 3, said flaps and projecting fingers further comprising a second shot softer injection molded plastic.

5. A ventilation module for a vehicle passenger compartment interior for providing dampening opening and closing motion, such as in response to an instantaneous interior pressure event, said module comprising:
    a rigid housing adapted to secure to a location of the vehicle to communicate an exterior with a passenger compartment interior;
    a flap hingedly secured along an inner edge to said housing and extending across an open interior of said housing, said flap further including side edges and an interconnecting outer edge spaced apart from said inner edge and sealing said open interior of said housing to prevent backflow of air from the exterior into the passenger compartment interior;
    a plurality of fingers projecting at spaced locations along at least said outer edge of said flap, an edge of each of said fingers abutting a surface of one of a plurality of standoff projections of said housing to establish a holding force; and
    said fingers each further including a bend axis which, in response to a positive air pressure condition created within the passenger compartment interior which overcomes the holding force exerted by said fingers against said stand-offs, causes said fingers to pivot and said flap to open in order to vent to the exterior the positive air pressure until reclosing upon the interior compartment achieving an air equilibrium condition with the exterior.

6. The ventilation module as described in claim 5, said housing having a generally rectangular shape with an outer perimeter adapting to securing said housing to the vehicle.

7. The ventilation module as described in claim 5, said housing and said standoff projections further comprising a rigid first shot injection molded thermoplastic.

8. The ventilation module as described in claim 7, said flaps and projecting fingers further comprising a second shot softer injection molded plastic.

9. The ventilation module as described in claim 5, further comprising a recessed location located between a base portion of said fingers and flap defining the bend axis for bending said fingers during opening of said flap.

10. The ventilation module as described in claim 9, further comprising said fingers pivoting in an over center fashion relative to said bend axis during opening of said flap.

* * * * *